United States Patent [19]

Ostreicher

[11] 4,007,113
[45] Feb. 8, 1977

[54] PARTICULATE FILTER MEDIUM AND PROCESS

[75] Inventor: Eugene A. Ostreicher, Farmington, Conn.

[73] Assignee: AMF Incorporated, White Plains, N.Y.

[22] Filed: July 22, 1975

[21] Appl. No.: 598,097

Related U.S. Application Data

[63] Continuation-in-part of Ser. No. 358,822, May 9, 1973, abandoned.

[52] U.S. Cl. .............................. 210/23 R; 210/504; 210/505
[51] Int. Cl.² ........................................ B01D 13/00
[58] Field of Search .......... 210/503, 504, 505, 506, 210/507, 508, 509, 23 R

[56] References Cited

UNITED STATES PATENTS

| | | | |
|---|---|---|---|
| 3,158,532 | 11/1964 | Pall et al. | 210/504 X |
| 3,238,056 | 3/1966 | Pall et al. | 210/506 X |

Primary Examiner—Frank A. Spear, Jr.
Attorney, Agent, or Firm—George W. Price; Charles J. Worth

[57] ABSTRACT

Improved filter media comprised of negatively charged high surface area particulate filter material the surface of which is modified with a melamine-formaldehyde cationic colloid; processes for the preparation thereof; and use in liquid filtration to remove submicron contaminants including negatively charged particles.

5 Claims, 1 Drawing Figure

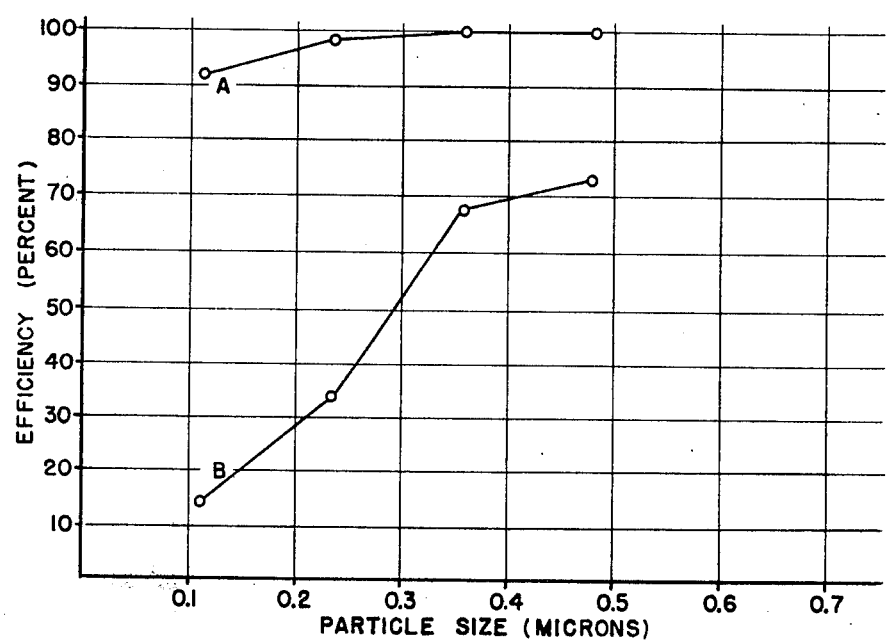

PARTICULATE FILTER MEDIUM AND PROCESS

This application is a continuation-in-part of copending Application Ser. No. 358,822, filed May 9, 1973, now abandoned.

This invention relates to a new process for treatment of negatively charged high surface area particulate filter material to improve the filtration efficiency for small particles, especially submicron particles, and the improved filter media obtained thereby.

The filtration of fine particle size contaminants from liquids has been accomplished by the use of various porous filter media through which the contaminated liquid is passed. With particulate filter materials, the filter media often takes the form of a porous cake or bed of the particulate material deposited on a porous support or substrate. To function as a filter, the media must allow the fluid, commonly water, through while holding back the particulate contaminant. This holding back of the particulate contaminant is accomplished by virtue of the operation, within the porous media, of one or both of two distinctly different filtration mechanisms, namely (1) mechanical straining and (2) electrokinetic particle capture. In mechanical straining, a particle is removed from the fluid stream by physical entrapment when it attempts to pass through a pore smaller than itself. In the case of the electrokinetic capture mechanism, the particle collides with a surface within the porous material and is retained on the surface by the attractive short range van der Waal's type forces.

In those particulate filter media that depend upon mechanical straining to hold back particulate contaminants, it is necessary that the pore size of the filter medium be smaller than the particle size of the contaminants that are to be removed from the fluid. If it is desired to remove suspended solids of a fine particle size with a particulate filter medium that functions by mechanical straining, the cake or bed formed by the filter material need have correspondingly small pores. Such a filter medium normally exhibits low flow rates and a tendency to clog rapidly.

In those filter media that function by virtue of the electrokinetic particle capture mechanism, it is unnecessary that the filter medium have such a small pore size. The ability to achieve the required removal of suspended particulate contaminants with a filter medium of significantly larger pore size is attractive inasmuch as it allows higher flow rates and reduces the tendency of the filter medium to clog rapidly. The ability of a filter medium to hold back suspended solids of a fine particle size by electrokinetic particle capture depends, to a significant extent, on the surface properties, particularly the surface charge, of both the filter material of which the medium is composed and the suspended solids. It is not feasible to measure the charge on a surface directly. Instead, various indirect techniques, such as electrophoretic mobility, streaming potential, etc., are used to determine the zeta potential, i.e., the electric potential excess of the surface, and the surrounding fluid to the hydrodynamic shear plane, over the bulk potential of the fluid. Inasmuch as surface charge can only be quantified in terms of the zeta potential, all further characterizations of surface charge will be in terms of the zeta potential. While the zeta potential exhibited by a surface normally depends upon the composition of the filter material, it may be modified by other materials that become adsorbed or chemically bonded to the surface of the filter material.

The effect of zeta potential on the electrokinetic capture mechanism is associated with the ability of the suspended solid contaminant particle to come into contact with a surface within the porous filter medium. In order for such contact to occur, it is necessary that either the contaminant particle or filter material surface possess a zero zeta potential, or that the surface have an opposite zeta potential from that of the contaminant particle. If the contaminant particle and the filter material surface have like zeta potentials, there will be a repulsive effect that interferes with the particle's ability to come into contact with the surface. Once in contact with the surface, the particle will be retained by short range van der Waal's forces, which are always attractive. In those situations where electrokinetic capture does occur, the filtration performance is enhanced by the availability of a high filter material surface area within the filter medium. The reason for this is that, as the oppositely charged particles deposit on the surface of the filter material, the deposited particles tend to modify the zeta potential of the surface and, eventually, the surface will develop a like zeta potential, effectively inhibiting any additional deposition. The availability of a high opposite charge and a high surface area thus extend the functional life of the filter medium. The particle size, and the geometry, porosity and depth of the filter medium also affect the life and filtration efficiency.

Asbestos fiber has long been used for filtration of fine or very fine solids and the use thereof has been well-documented in the literature, e.g. Proceedings of the Filtration Society, Filter Sheets and Sheet Filtration by Geoffrey Osgood, published in *Filtration and Separation*, July/August 1967, pp. 327–337 (A paper originally presented at the Filtration Society Meeting, London, Apr. 4, 1967), also, Proceedings of the Filtration Society, Asbestos Filter Sheets by D. McLean Wyllie, published in *Filtration and Separation*, March/April 1973, pp. 175–178 (A paper originally presented at the second joint AICHE-Filtration Society Symposium, Minneapolis, Minnesota, Aug. 27–30, 1972). The high filtration efficiency of asbestos fibers is attributable not only to mechanical straining effects but also to the fineness and high surface areas of the fibers, which, in conjunction with the positive zeta potential exhibited by asbestos, result in a highly efficient electrokinetic capture of negatively charged contaminant particles. Attempts to duplicate the filtration efficiency of asbestos in other materials by duplicating the physical state (size, shape, etc.) of asbestos fibers have, up to the present, not been effective. For example, duplication of asbestos filter material with glass fibers, or diatomaceous earth, has not provided filtration efficiency even approaching that of asbestos. No other filter material has a positive zeta potential of the same order as asbestos fiber.

In the past, improvement in the filtration efficiency of filter material has taken several approaches. Improved filtration performances have been realized by chemical treatment to alter the surface properties and, thereby, the size of the suspended solids (i.e., flocculation) to improve the straining effects. (See U.S. Pat. Nos. 3,131,144; 3,227,650; 3,325,492; 3,297,106; 3,542,674; 3,562,154 or 3,668,184). Improved filter performance is also realized by altering the surface properties of the filter material. (See U.S. Pat. Nos. 2,040,818; 2,036,258; 2,797,163 or 2,971,907).

Development of the art has favored the application of specific highly charged polyelectrolyte materials. Thus, U.S. Pat. 3,352,424 and 3,242,073 describe the coating of filter materials with organic polyelectrolytes, e.g. polyalkylenimines. Baumann et al, in "Polyelectrolyte Coatings for Filter Media" Proceedings of the Filtration Society: Filtration and Separation (Nov./Dec. 1970) pp. 652–690 describe additional research.

These polyelectrolyte materials are unfortunately of relatively sophisticated structure, high molecular weight, high charge density and concomitantly have high manufacturing cost. Accordingly, advantage is seen in the provision of a cheaper but efficacious substitute.

An improvement in liquid filtration as for food and beverage compositions, pharmaceuticals, or in water purification and the like, especially for submicron negatively charged contaminants has now been achieved by modifying the surface of negatively charged particulate high surface area filter materials with a cationic melamine formaldehyde colloid. Surprisingly, the improvement is afforded by treatment with the colloid form of a melamine formaldehyde resin despite its low molecular weight and low specific charge. The resin is applied, as hereinafter described more particularly, to the particulate filter material, and the porous filter medium in the form of a filter bed or cake is subsequently formed dynamically in a manner well-known to the art, as by vacuum techniques.

Melamine-formaldehyde resins including the cationic colloid are well-known and these resins have commonly been used in the paper industry to impart water resistance, i.e., wet-strength, as shown in U.S. Pat. No. 2,563,897. Melamine-formaldehyde colloids are formed from solutions of a melamine monomer acid addition salt by condensation of about 20 units of the monomer with elimination of water to form cationic colloid particles. During formation, some of the acid of the monomer addition salt is liberated and the progress of condensation can be followed by measuring the drop in pH. The chemistry of melamine-formaldehyde colloids is described in numerous literature articles, e.g. Chapter 2, Melamine Formaldehyde, C. S. Maxwell, *Wet Strength in Paper and Paper Board*, Tappi Monograph Series No. 29, 1965 and *Amino Resins*, John J. Blair, pp. 19–25, Reinhold Publishing Corp., New York, 1959, and the specific colloids of the invention may be prepared in accordance with these disclosures or U.S. Pat. Nos. 2,345,543; 2,559,220 or related U.S. Pat. Nos. 2,485,079–80. The compounds generally designated melamine-formaldehyde embrace the methylol melamine monomers in which there are from 1 to 6 methylol substituents, the most commonly employed being the di- or trimethylol compounds.

High surface area particulate filter materials are well-known in the art and include such recognized materials as diatomaceous earth, perlite, sand, etc. These materials are characterized by either the finely-divided state in which they exist, or a fine internal porosity, either of which provides a high surface area per unit volume. The non-porous particulate solids such as perlite and sand are characterized by particles of a size small in comparison to the normally used depth of the filter bed, whereas diatomaceous earth is additionally characterized by a fine internal pore structure. These high surface area particulate filter materials tend to exhibit a negative zeta potential. Consequently, when such material is used for filtration of fine particle suspended solids, there is no particle removal by electrokinetic capture because most suspended solids are also negatively charged. Thus, the only filtering effect attainable with these negatively charged filter materials is the so-called straining effect described hereinbefore. Thus, the efficiency of such filter materials with fine particle suspended solids is limited and never approaches the filtration efficiency of positively charged filter materials known to be useful for this purpose, e.g. asbestos fibers.

The present invention is concerned with overcoming the deficiencies of the negatively charged, high surface area particulate filter materials in an economical manner to permit use of these materials in filter media for filtration of finely-divided suspended solids. Essentially, the present invention utilizing a melamine-formaldehyde colloid provides a process which at least reduces the negative charge on filter materials of the type described and thus enhances electrokinetic capture of fine particle suspended solids. The colloid particles appear to adhere to the surface of the filter material producing highly positively charged sites on the surface so that filter media composed of particulate filter materials so treated are capable of removing, by electrokinetic capture fine particle suspended solids which without such modification, would not be removed by the filter medium. Filtration efficiency determinations indicate that modified filter media can produce the same order of efficiency as asbestos fibers. In view of the present knowledge of filtration mechanisms and the nature of asbestos' function, these comparative data suggest that the modified filter media have a positive charge similar in nature to that of asbestos and that the enhanced filtration efficiency is attributable to this charge modification. It appears then that the deposited melamine-formaldehyde colloid particles surprisingly must retain their cationic properties after adsorption and drying if in fact the mechanism of filtration occurs as theoretically postulated. While not wishing to be bound by any theoretical explanation of the phenomenon observed, the applicant offers the foregoing as an explanation of the results observed, which are surprising and most unexpected since the melamine-formaldehyde colloids would not be expected to retain their cationic properties after their deposition onto the fiber surface and subsequent drying and this phenomenon has not been recognized in the prior art.

The process of this invention is accomplished by merely contacting the melamine-formaldehyde colloid with the selected filter material, conveniently in a suitable medium. The colloid dispersions are normally and conveniently prepared in aqueous media which is also suitable for the modification of the filter material. In a simple form of the present process, the filter material is added to an aqueous dispersion of the colloid particles and mixed by any convenient means to assure commingling of the respective solids. In a very short period of time, the colloid deposits on the filter material, usually within several minutes, and the mixture can be further processed as desired to separate and dry the modified filter material. Alternative mixing sequences, and alternative treatment techniques such as spraying or blending are equally suitable as means for treating the filter material with the melamine formaldehyde colloid. If desired, the filter material can be further treated while in the aqueous mixture or in the final dried condition by addition of further materials, e.g. cellulose fibers which can serve as a self-bonding matrix to form a sheet type filter medium.

The process conditions are not critical as long as the colloid is permitted to contact the filter material. The amounts of the dispersion medium, e.g. water, do not seem to be critical. Even when large volumes of water are used, i.e., a dilute medium with only minimum amounts of colloid (e.g. below 5% by weight of filter material), and filter material (e.g. about 1–2% by weight of liquid) modification of the filter material occurs. The dispersing medium employed should be polar to permit the deposition to proceed efficiently. The time required for modification does not appear critical since deposition reaches a high percentage of final equilibrium values almost instantly with about 0.5 to about 6 minutes being adequate for most purposes. Of course, longer periods of exposure, e.g. up to several hours, can be used to assure relatively complete deposition. A period of about 15 minutes up to two hours is typical.

The amount of colloid added to the filter material is not critical but is merely a matter of functionality. For example, a high surface area filter material may require more resin for optimum filtration than one of lower surface area. Nevertheless as the resin is adsorbed onto the surface area of the material, the filtration efficiency is enhanced, so that even small amounts of the colloid are effective.

The melamine-formaldehyde used to produce the colloid in the present process can readily be obtained from commercial sources. Most commonly, a di- or trimethylolmelamine is used and is generally preferred. The monomethylol melamines do not appear to be as effective while the tetra-, penta- and hexa- methylolmelamines do not appear to provide any advantage over the di- or trimethylol derivative and are more expensive. If desired, these melamine derivatives can be prepared as described in the scientific literature.

The filter material is, of course, readily attainable from commercial sources and may be prepared by methods described in the literature. Thus, diatomaceous earth filter aid is obtainable from Johns-Manville, Celite Division, in a variety of particle sizes. Similarly, perlite of various dimensions is available from Dicalite Division, Grefco Inc.

For the purpose of the present invention, any high surface area, particulate filter material which exhibits a negative zeta potential can be modified by the present process to improve the filtration performance. In the present disclosure and the appended claims, the expression "high surface area" is intended to mean fine particle size porous and non-porous particulate materials such as diatomaceous earth or perlite with high specific surface areas e.g. in excess of 1 $m^2/gm$. or non-porous particulate materials, such as glass spheres and sand, in which the diameter of the particulate is small in comparison to the depth of the filter bed formed, (e.g. sand particles range up to several hundred microns and glass up to 500 microns in diameter, but filter beds of these materials are measured in feet, such as an eight foot depth sand bed); the expression "negative filter material" means a filter material which exhibits a negative zeta potential. In every instance, reference to diameter is intended to refer to average diameter as is common practice in referring to fine particle dimensions.

DESCRIPTION OF PREFERRED EMBODIMENTS

A preferred filter material is diatomaceous earth. Other suitable filter materials include non-porous particulate solids, such as perlite or sand; or mixtures in all proportions of materials such as diatomaceous earth/perlite. Perlite containing media are preferred where bulk density is a consideration.

Low molecular weight (1,000–4,000) melamine-formaldehyde resin colloids are preferred since they are readily prepared or available and provide stable colloids with substantial shelflife in aqueous suspension. Colloids prepared from di- and tri- methylolmelamines are preferred. This invention contemplates the use of other substituted melamine-formaldehyde resins which form cationic colloids similar to those produced with di- or trimethylolmelamine, but the di- and trimethylolmelamines are preferred because they are commercially available and economical, and readily form colloids. Higher methylol content does not seem to be any more efficient than the trimethylolmelamine resins and, because they are more costly, the tetra to hexamethylolmelamines are less attractive for use.

The liquid medium for the present process is a polar medium, advantageously an aqueous medium as mentioned hereinbefore. Water is the simplest, most adequate and most economical and therefore is preferred.

In the modification process, the colloid and the filter material are merely added to water and then subjected to mixing to provide intimate contact between the respective solids. For most purposes, it is sufficient to stir the mixture for short periods of time to permit mixing of the respective solids and then allow the suspended solids to settle out. Usually, the colloid is added to the reaction mixture in the form of an aqueous dispersion of from about 3% to about 50% by weight, although from about 5% to about 20% by weight is preferred. Typically 5–7% solids is used with Parez 607 colloid. The weight of colloid based upon filter material in the dispersion ranges from the minimum to effect charge modification up to about 50% preferably about 10%, and up to about 40%, with optimum results seen for selected materials in the 5 to 25% range. As hereinbefore mentioned, the amount of water used as the medium is not critical but sufficient water should be present to permit the necessary contact between the colloid and filter material.

After mixing, the surface-modified filter material can be separated from the reaction mixture by any method which is conventional, e.g. decantation followed by filtration through a suitable filter. The separated filter material can then be dried, washed or further treated to produce the final filter form according to recognized procedures. Where desired, a matrix of self-bonding fibers may be used to form filter sheet. The self-bonding fibers can be added directly to the filter aid dispersion and, after further mixing, the entire mass can then be processed into filter sheet by methods well-known to the art. The preferred self-bonding fiber for the matrix is cellulose, which is commonly used in filter sheet production. The usual amount of cellulose fibers used as matrix lies in the range of from about 50% to about 90% by weight of the filter sheet.

The filtration efficiency realized with the surface-modified filter materials of this invention are illustrated in the enclosed FIGURE, a plot of percentage efficiency of filtration versus the particle size of suspended solids being filtered, for a diatomaceous earth treated with melamine-formaldehyde colloid (curve 'A') compared with untreated D.E. (curve 'B'). The FIGURE clearly illustrates the unexpectedly higher efficiency of surface charge modified filter in removal of suspended solids of submicron dimension, e.g. less than about 0.7 micron in diameter.

In the following examples further illustrating the invention the test procedures, techniques and materials utilized are as follows:

1. Preparation of Colloid
   A. Materials (for 10 gallons):

| | | |
|---|---|---|
| Water, 70 ± 20° F. | 8.8 | gallons |
| Muriatic Acid, 30° Be | 0.4 | gallons |
| "Parez" Resin 607 | 10.0 | pounds |

Add resin to acid-water mixture using agitation until complete solution is obtained (approx. 30 minutes as indicated by colorless, water-clear solution). An aging period of at least three hours is required to allow formation of colloid as indicated by formation of distinct bluish haze. For better stability in storage, the colloid dispersion is diluted to six percent solids.

B. Improved performance for Parez 607 systems may be secured by utilizing reagent grade hydrochloric acid, at an acid ratio (moles Hcl/moles resin) of 0.60 to 0.65.

Preparation A was employed for Example I, and preparation B for the remaining Examples.

2. Treatment

Particulate filter material, at a 2.5% consistency, is slurried in water, and the colloid dispersion added (6% solids) to provide a filter material/colloid weight ratio of 10:1. Contact time is at least 15 minutes whereupon the treated material is isolated, drained and dried at 250° F for 30 minutes.

3. Test Contaminant

Test contaminant except as otherwise noted consisted of monodisperse polystyrene latices (Dow Diagnostics) of the following sizes:
0.109 microns
0.234 microns
0.357 microns
0.481 microns
0.794 microns The particular latex used in a test is mixed with double glass distilled water to produce a dispersion with a turbidity of 100 FTU (Formalin Turbidity Units, also referred to as the equivalent, NTU or Nephalometric Turbidity Units) as measured on a Hach Model 2100A Turbidimeter. The pH of the test dispersion is 6.5 – 7.0.

4. Test Technique (Efficiency vs. Particle Size)

The treated particulate filter material is slurried in 100 ml of water and filtered through the porous fritted glass holder base in a Millipore 47 mm vacuum filter holder, until a ¼ inch thick cake is formed (typically 1⅜ inches diameter). 100 ml of the prepared latex contaminant dispersion is filtered through the cake using a 23 in. Hg vacuum. The turbidity of the filter effluent is measured using the Hach Turbidimeter. Filtration efficiency is determined from the formula:

Efficiency = Turbidity In - Turbidity Out/Turbidity In

Untreated particulate filter material is also tested for comparison.

EXAMPLE I 2.5 grams of commercially available diatomaceous earth filter aid (J.M. Celite 545 relative flow rate 2160; 11.7% retained on 150 mesh screen) is slurried into 100 ml of water. To this is added 8.33 grams of the 6% resin colloid dispersion prepared as described above (Preparation A). The resulting slurry is agitated for 15 minutes.

The treated diatomaceous earth is dewatered by filtration using No. 54 Whitman filter paper, and then dried in an oven at 250° F. for 30 minutes. The resulting material is easily redispersed into water after treatment.

The filtration efficiency for treated ('A') and untreated ('B') filter materials is as shown in the accompanying FIGURE, illustrating the high efficiency of the surface charge modified material in removal of suspended solids less than about 0.7 micron in diameter.

EXAMPLE II

A. Treated diatomaceous earth samples of different relative flow rating (Johns-Manville:indirect measure of particle size) were tested for filtration efficiency and compared to untreated control samples all in accordance with the previously desired test procedure giving the following results:

TABLE I

| D.E. | % Retained on 150 mesh | Relative-flow rating (Johns-Manville) | | Filtration Efficiency % | | |
|---|---|---|---|---|---|---|
| | | | | .109 micron | .234 micron | .357 micron |
| Filter Cel | 0.6 | 100 | Untreated | 79 | 88 | — |
| (natural) | | | Treated | 99.8+ | 99.9+ | — |
| Celite 505 | — | 135 | Untreated | 32 | 44 | — |
| (calcined) | | | Treated | 99.8+ | 99.9+ | |
| Standard Super Cel | 2.5 | 200 | Untreated | 30 | — | — |
| (calcined) | | | Treated | 99.6 | 99.7 | — |
| Celite 512 | 4.4 | 300 | Untreated | 23 | 55 | 73 |
| (calcined) | | | Treated | 96.4 | 99.8 | 99.7 |
| Hyflo Super Cel | 5.0 | 500 | Untreated | 10 | 41 | 63 |
| (flux-calcined) | | | Treated | 97.7 | 99.4 | 99.6 |
| Celite 501 | 7.5 | 750 | Untreated | 14 | 33 | 41 |
| (flux-calcined) | | | Treated | 90.7 | 99.7 | 74.0 |
| Celite 503 | 8.8 | 900 | Untreated | 3 | 47 | 64 |
| (flux-calcined) | | | Treated | 84.0 | 99.7 | 99.9 |
| Celite 535 | 9.1 | 1350 | Untreated | — | 30 | 47 |
| (flux-calcined) | | | Treated | — | 94.3 | 99.3 |
| Celite 545 | 11.7 | 2160 | Untreated | — | 34 | 54 |
| (flux-calcined) | | | Treated | — | 97.3 | 99.5 |
| Celite 560 | 48. | 7500 | Untreated | — | — | 45 |

TABLE I-continued

| D.E. | % Retained on 150 mesh | Relative-flow rating (Johns-Manville) | Filtration Efficiency % | | |
|---|---|---|---|---|---|
| | | | .109 micron | .234 micron | .357 micron |
| (flux-calcined) | | Treated | — | — | 97.7 |

The efficiency of the untreated D.E. is seen to drop sharply for fine particle size contaminants as its own dimension increases, a straining phenomena reflecting the tightness of the cake structure with the fine filter aid types. However, treated materials evidence an improvement in performance in each case over the range. Similar results are obtained with Speed Plus (a flux-calcined D.E. of 9.1 micron mean particle size). Speedflow (calcined, 6.0 micron) and Dicalite 215 (calcined, 2.7 micron); and filtration improvement noted with drained but not dried surface charge modified materials.

B. As a comparison, D.E. samples were treated with a 6% solution of a water soluble melamine-formaldehyde resin (Cymel 481), drained and dried at 250° F. for 30 minutes. The filtration efficiencies using the same test procedure, relative to a control (untreated) D.E. are reported in the following:

TABLE II

| D.E. | | Filtration Efficiency % | | | | |
|---|---|---|---|---|---|---|
| | | .109 microns | .234 microns | .357 microns | .481 microns | .794 microns |
| Celite 503 | Untreated | 17 | 32 | 80 | 72 | 96 |
| | Treated Cymel 481 | 0 | 62 | 89 | 93 | 92 |
| Celite 545 | Untreated | 6 | 17 | 17 | 58 | 94 |
| | Treated, Cymel 481 | 0 | 13 | 26 | 28 | 53 |

In the region (lower particle size contaminant) where discrimination of results is meaningful, the water soluble resin becomes less effective with reducing particle size contaminant (especially with the larger particle size D.E.) as distinct from the colloidal resin.

EXAMPLE III

Treated Dicalite Perlite grade 416 (mean particle size 3.9 microns, surface area 3.65 m²/g) samples were prepared with Parez 607 colloid, and a solution of Cymel 481, (water-soluble non-colloidal melamine-formaldehyde) respectively, at an equal solids weight basis (10:1 ratio of filter material to colloid in the respective dispersions).

The resulting samples, along with an untreated control were tested in accordance with the previously described procedures, giving the following results.

TABLE III

| Test Contaminant | Filtration Efficiency % | | |
|---|---|---|---|
| Dow Diagnostics Latex, 100 NTU | Control Perlite 416 Untreated | Perlite 416 Treated Parez 607 colloid | Perlite 416 Treated Cymel 481 non-colloid |
| .109 micron | 0 | 86 | 0 |
| .234 micron | 77 | 98 | 33 |
| .357 micron | 82 | 97 | 79 |
| .481 micron | 83 | 98 | 90 |
| .794 micron | 88 | 99 | 91 |

The remarkably high efficiency of the colloid treated perlite is apparent, especially with the lower particle size contaminants.

Similar results are obtained with Perlite 416 (3.9 micron), Perlite 426 (4.2 micron) and Perlite 4106 (10 microns); and filtration improvement noted with drained but not dried surface charge modified materials.

EXAMPLE IV

A. Coarse washed sand (40% 880 to 1100 micron, 30% 440 to 880 micron, and 30% 110 to 440 micron) was dispersed in water to form a slurry, the slurry was disposed in a columnar filter housing and drained and dried, to form a filter bed of ⅝ inch diameter 23 inches in depth. A similar sand slurry was treated in standard manner with Parez 607 colloid.

The respective beds were then competitively tested for filtration efficiency as described above, with the following results.

TABLE IV

| Test Contaminant Dow Diagnostics Latex, 100 NTU | Control (Untreated Sand) | Filtration Efficiency, % Treated Sand (607 Colloid) |
|---|---|---|
| 0.109 micron | 0 = no measurable reduction | 72 |
| 0.234 micron | 0 = no measurable reduction | 67 |
| 0.357 micron | 0 = no measurable reduction | 75 |
| 0.481 micron | 0 = no measurable reduction | 76 |

TABLE IV-continued

| Test Contaminant Dow Diagnostics Latex, 100 NTU | Control (Untreated Sand) | Filtration Efficiency, % Treated Sand (607 Colloid) |
|---|---|---|
| 0.794 micron | 10 | 91 |

B. Further testing was carried out with water soluble non-colloidal melamine-formaldehyde resin (Cymel 481) on an equal weight basis, and a sand bed formed in the same manner. The resin aided filtration through a bonding action, but efficiencies for the respective test contaminant species were only 42, 56, 59, 72 and 83. The masking effect of straining type filtration is seen with the larger particle size contaminants with marked improvement evidenced for the colloid with the smaller particle sizes.

EXAMPLE V

In a further series of experiments, the level of applied colloid was varied to determine the effect upon effluent turbidity, utilizing a test solution of water and polystyrene latex contaminant (.109 micron) with inlet turbidity established at 100 FTU. The results are tabulated as follows:

| Filter Cel (D.E.) | Colloid Percent | Filtration Efficiency,% |
|---|---|---|
| | 0 | 79.0 |
| | 5 | 97.7 |
| | 10 | 99.8+ |
| | 20 | 99.5+ |
| Celite 505 | 0 | 32.0 |
| | 5 | 97.9 |
| | 10 | 99.8+ |
| | 20 | 99.4+ |
| Std. Super Cel | 0 | 30 |
| | 5 | 93.3 |
| | 10 | 98.6 |
| | 20 | 96.0 |

Optimized performance is evidenced in the region of 10% by weight of colloid.

The foregoing Examples illustrate the remarkable improvement in filtration performance achieved with the surface modification of high surface area filter materials utilizing melamine-formaldehyde colloids. Surprisingly, little effect is seen on normal cellulose fiber as employed in filter paper; the following comparative Example is representative.

EXAMPLE VI

Cellulose (Coho kraft wood pulp) was slurried with a 6% Parez 607 acid colloid dispersion to provide 10% by weight of colloid relative to the cellulose, and a sheet was formed in conventional manner. (300 gm, 27 × 27 inch sheet).

Performance of treated and untreated sheet, formed in the same manner, was determined in a membrane protection test. A test solution of water contaminated with a polydisperse acrylic latex (Hyplar manufactured by Grumbacher) produced by emulsion polymerization and comprising colloidal polymer particles ranging from 0.05 to 1.0 microns (50 FTU) was pumped through the test filter media and a membrane (47 mm, 0.22 micron) in series at a flow rate of 225 ml/min, and differential pressure with time recorded.

Neither treated nor untreated filter media provided membrane protection, failure occurring within one minute.

Similarly, asbestos-cellulose filter media show no improvement in filtration when treated with the colloid, because deposition occurs only on the cellulose fibers (asbestos fibers, being cationic, will not accept the cationic colloid).

Filter media in accordance with the invention, may be employed alone or in combination with untreated filter media to treat pharmaceuticals such as antibiotics, saline solutions, dextrose solutions, vaccines, blood plasma, serums, sterile water or eye washes; beverages, such as cordials, gin, vodka, beer, scotch, whisky, sweet and dry wines, champagne or brandy; cosmetics such as mouthwash, perfume, shampoo, hair tonic, face cream or shaving lotion; food products such as vinegar, vegetable oils, extracts, syrups, fruit juices, make-up water or cooking oils; chemicals such as antiseptics, insecticides, photographic solutions, electroplating solutions, cleaning compounds, solvent purification and lubricating oils; and the like for retention of submicronic particles, removal of bacterial contaminants and resolution of colloidal hazes.

In the foregoing examples, the melamine-formaldehyde resin used is identified as Parez Resin 607 which is an unfilled, spray-dried trimethylolmelamine which is normally used in the paper industry for its wet strength properties. Similar results are obtained with Cymel 409, a dimethylolmelamine product, when it is used in place of Parez Resin 607. Both resins are available from American Cyanamid.

What is claimed is:

1. An improved filter medium consisting essentially of a matrix of self-bonding fibers, and diatomaceous earth, the surface of which is modified with melamine-formaldehyde cationic colloid.

2. An improved filter medium consisting essentially of a matrix of self-bonding fibers, and perlite, the surface of which is modified with melamine-formaldehyde cationic colloid, said perlite having a cake density of less than about 20 lbs./ft$^3$.

3. An improved filter medium of enhanced electrokinetic capture potential for contaminated liquids comprising suspended electronegative particles of about 0.1 to 0.7 micron diameter, said filter medium consisting essentially of
   1. high surface area electronegative particulate filter material, the electric (zeta) potential of the surface of which is modified with melamine-formaldehyde cationic colloid; and
   2. a matrix of self-bonding fibers.

4. The improved filter medium of claim 3, wherein said self-bonding fibers are comprised of cellulose, and the surface of said particulate filter material is electropositive.

5. A process for the filtration of contaminated liquids comprising suspended electronegative particles of about 0.1 to 0.7 micron diameter, said process comprising passing said contaminated liquid through the filter medium of claim 3.

* * * * *